United States Patent
Marent et al.

(10) Patent No.: US 8,482,211 B2
(45) Date of Patent: Jul. 9, 2013

(54) CIRCUIT FOR THE OPERATION OF AT LEAST ONE LED

(75) Inventors: Guenter Marent, Bartholomaberg (AT); Michael Zimmermann, Heiligkreuz (CH); Alexander Barth, Alberschwende (AT); Markus Mayrhofer, Dornbirn (AT)

(73) Assignees: Tridonic GmbH and Co KG, Dornbirn (AT); Tridonic AG, Ennenda (CH)

( * ) Notice: Subject to any disclaimer, the term of this patent is extended or adjusted under 35 U.S.C. 154(b) by 238 days.

(21) Appl. No.: 13/125,791

(22) PCT Filed: Oct. 15, 2009

(86) PCT No.: PCT/EP2009/007405
§ 371 (c)(1),
(2), (4) Date: Jun. 17, 2011

(87) PCT Pub. No.: WO2010/046055
PCT Pub. Date: Apr. 29, 2010

(65) Prior Publication Data
US 2011/0254457 A1  Oct. 20, 2011

(30) Foreign Application Priority Data
Oct. 22, 2008 (DE) .................... 10 2008 052 714

(51) Int. Cl.
*H05B 37/02* (2006.01)
(52) U.S. Cl.
USPC ........................................................ 315/210

(58) Field of Classification Search
USPC ........................................................ 315/210
See application file for complete search history.

(56) References Cited

U.S. PATENT DOCUMENTS

| | | | |
|---|---|---|---|
| 2006/0113975 A1* | 6/2006 | Mednik et al. | 323/282 |
| 2006/0197720 A1 | 9/2006 | De Oto et al. | |
| 2009/0273292 A1 | 11/2009 | Zimmermann | |

FOREIGN PATENT DOCUMENTS

| | | |
|---|---|---|
| DE | 102006034371 A1 | 10/2007 |
| EP | 2014135 A1 | 1/2009 |
| WO | WO 2006093870 * | 9/2006 |
| WO | WO2006093870 A1 | 9/2006 |
| WO | WO2007121870 A1 | 11/2007 |
| WO | WO2007121945 A2 | 11/2007 |

OTHER PUBLICATIONS

Patent Search Report, PCT/EP2009/007405, dtd Feb. 18, 2010, 2 pages.

* cited by examiner

*Primary Examiner* — Thienvu Tran
(74) *Attorney, Agent, or Firm* — Lee & Hayes, PLLC

(57) ABSTRACT

A circuit for operating at least one LED ("driver circuit") includes input terminals to be connected to an input or operating voltage in the form of a direct current (DC) voltage or a rectified alternating current (AC) voltage, and output terminals to be connected to a load circuit containing the at least one LED. The circuit includes a clocked switch and an open-loop control circuit for clocking the switch. The open-loop control circuit is in the form of an integrated circuit (IC) and is provided with input and output pins. The open-loop control circuit generates a clock signal for the switch depending on at least two actual value signals, such that there is a control loop with the manipulated variable "clocking of the switch."

20 Claims, 6 Drawing Sheets

CIRCUIT FOR THE OPERATION OF AT LEAST ONE LED

This Application is the National Stage of International Application No. PCT/EP2009/007405, filed Oct. 15, 2009, which claims foreign priority to German Application No. 10 2008 052714.9, filed Oct. 22, 2008, both of which are incorporated herein by reference.

The invention relates to a circuit for operating at least one LED ("driver circuit"). Such a driver circuit has:
  input terminals, which are intended to be connected to an input or operating voltage in the form of a DC voltage or a rectified AC voltage,
  output terminals, to which a load circuit is intended to be connected, said load circuit containing the at least one LED,
  a clocked switch,
  an open-loop control circuit for clocking the switch, said open-loop control circuit being in the form of an IC, preferably an ASIC, and being provided with input and output pins,
  wherein the open-loop control circuit generates a clock signal for the switch depending on at least two actual value signals to this extent there is therefore a control loop with the manipulated variable "clocking of the switch",
  wherein the two actual value signals are associated with different switching phases of the switch,
  wherein the inductor is configured in such a way that it is charged in one switching phase of the switch and is discharged in the other switching phase, and
  wherein a current is driven through the load circuit, at least in the latter switching phase.

Figure 1:
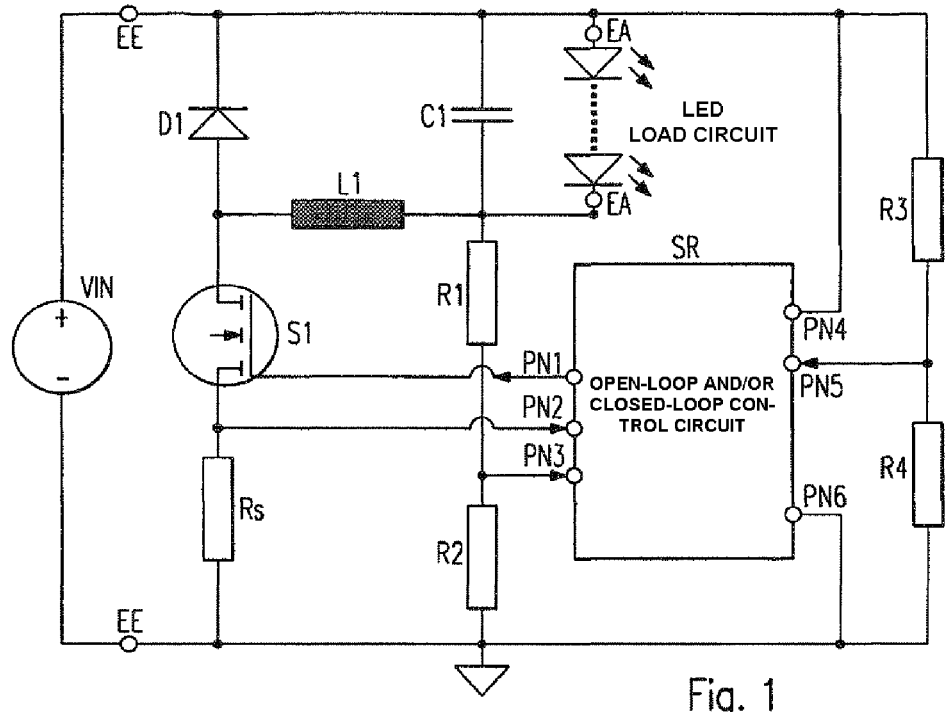

A circuit of the abovementioned type is known (WO 2007/121870 A1). In this known circuit, two actual value signals are generated and supplied to two input pins of an ASIC which are provided for this purpose. The first actual value signal represents the inductor current during the on phase of the switch. The second actual value signal represents a value, from which the voltage across the load circuit can be determined taking into consideration the operating voltage, which is likewise determined as an actual value signal. Thus, the second actual value signal also represents the voltage across the load circuit during the off phase of the switch. A further input pin of the ASIC is provided for the actual value signal representing the operating voltage. The known circuit is shown in FIG. 1.

The power made available to the load circuit by the circuit is dependent on various parameters, inter alia also on the load itself. In order to be able to match the circuit to loads which are sometimes not precisely known or are variable, the clock frequency or the duty factor for the clocked switch can be varied. For this purpose, the ASIC requires information relating to the way in which the load affects the operation of the circuit. This information is provided by the at least two actual value signals, wherein each actual value signal is associated with a different switching phase of the switch. As mentioned, a separate input pin is provided in the known ASIC for each of the two actual value signals.

The invention is based on the problem of providing the circuit or the integrated open-loop control circuit thereof (for example ASIC, μC etc.) with a simpler configuration and thus of being able to produce said circuit or open-loop control circuit more cheaply.

The solution to this problem is the subject matter of the claims, with the full contents of the text of said claims being incorporated by reference in the disclosure of the description.

One proposed solution consists in that the two actual value signals are supplied to a common input pin. For this purpose, they are tapped off at a common measurement point in the LED driver circuit. It is thus possible for at least one pin for the IC to be dispensed with. In order that the IC can discriminate the actual value signals and evaluate them separately, it is preferably proposed to provide corresponding decoupling means. Details relating to this solution are given in the dependent claims.

Exemplary embodiments will be described with reference to the drawings, in which:

FIG. 1 shows a known circuit (WO 2007/121945 A2) representing the prior art; and FIGS. 2 to 11 show various exemplary embodiments of circuits according to the invention.

The functional principle of the circuit according to the invention will first be explained with reference to FIG. 1. The circuit for operating an LED load circuit ("LED driver circuit") has two input terminals ("input pins") EE and two output terminals ("output pins") EA.

The LED load circuit is connected to the two output terminals EA and consists of a series circuit of LEDs. The input terminals EE of the circuit are connected to an input voltage source or operating voltage source VIN, which supplies a DC voltage or a rectified AC voltage to the circuit. The negative DC voltage potential of the operating voltage is connected to the lower input terminal EE and thus forms a reference potential or ground. The positive potential of the operating voltage is connected to the upper input terminal EE of the circuit and thus forms a high potential point. The LED load circuit is connected between the high potential point and a mid-potential point, which will be explained in more detail later.

The voltage across the input terminals can be provided by an active (clocked) power factor circuit (PFC circuit).

A series circuit comprising a freewheeling diode D1, a clocked switch S1 and a low-resistance measuring resistor ("shunt") Rs is connected across the operating voltage. The cathode of the freewheeling diode D1 is connected to the high potential point. Its anode is connected to the drain terminal of the switch S1 in the form of a MOSFET. The shunt Rs is connected between the source terminal and ground. An inductor L1 extends between the mid-potential point of the load circuit and the node connecting the switch S1 and the freewheeling diode D1. The LED load circuit is preferably bridged by a charging capacitor C1.

The switch S1 is driven (clocked) by an open-loop control circuit SR and, for this purpose, has an output pin PN1 which is connected to the gate terminal of the switch S1. The open-loop control circuit SR furthermore has an input pin PN2 for a first actual value signal and a further input pin PN3 for a second actual value signal. In addition, the open-loop control circuit SR is also provided with a further input pin PN5, to which a third actual value signal is supplied.

To this extent there is therefore a control loop with the manipulated variable "clocking of the switch".

A first voltage supply pin PN4 is connected to the high potential point, and a second voltage supply pin PN6 is connected to ground in order thus to supply the necessary operating energy to the open-loop control circuit SR.

When the switch S1 is switched to the on state, current flows from the negative operating potential point (ground) via the shunt Rs, through the switch S1, and then through the inductor L1 and the LED load circuit. In this on phase, current flows through the LEDs and thus causes the LEDs to illuminate. At the same time, the inductor L1 is charged magnetically. The freewheeling diode D1 is in the off state in this phase. The charging capacitor C1 is also charged and smoothes the current flow through the LED load circuit.

When the switch S1 is turned off, the inductor L1 is discharged via the LED load circuit and the freewheeling diode D1, which is now turned on. In the process, the current through the LED load circuit decreases continuously until the inductor L1 has been partially or completely discharged. The charging capacitor C1 is also discharged.

When the inductor L1 is completely discharged, the charging capacitor C1 is discharged temporally beyond the complete discharge of the inductor L1, with the result that the current through the inductor L1 crosses zero, but the current continues to flow through the LED load circuit. In the event of the switch S1 being switched on again, the procedure is repeated. In this way, a voltage with a saw-tooth waveform is produced across the LED load circuit. The current through the LED load circuit also has a saw-tooth profile around a mean value, preferably without dropping to zero ("continuous conduction mode"), but can also drop to zero ("critical mode" or "borderline mode" between the "continuous conduction mode" and the "discontinuous conduction mode" or "discontinuous conduction mode").

The ripple of the mean value is dependent, inter alia, on the size of the charging capacitor C1. The current through the inductor L1 also has a saw-tooth profile around a mean value, either without dropping to zero ("continuous conduction mode") or with a drop to zero ("critical mode" or "borderline mode" between the "continuous conduction mode" and the "discontinuous conduction mode" or "discontinuous conduction mode").

When the on phase of the switch S1 is extended and the off phase is shortened, i.e. when the duty factor of the switching signals for the switch S1 is altered, in total the mean current value which is supplied to the LED load circuit and therefore also the power supplied to the LED load circuit are increased. Conversely, the current and power are reduced when the on phase for the switch S1 is shortened and the off phase is extended.

The current through the load circuit and the voltage across the load circuit as well as the power supplied to the load circuit are dependent not only on the duty factor or on the clock frequency at which the switch S1 is controlled but, in addition to further, other parameters such as the inductance of the inductor L1 or the capacitance of the charging capacitor C1, also on the nature of the load circuit itself. When the nature of the load circuit is unknown or varies for example as a result of aging, the open-loop or closed-loop control conditions for the clocking of the switch S1 change. This applies in particular when the load circuit comprises an unknown number of LEDs. It is therefore necessary to feed information to the open-loop and/or closed-loop control circuit SR which makes it possible for said circuit to calculate the open-loop control signals for the clocking of the switch S1.

A first actual value signal is the switch current, for example measured via the voltage drop across the shunt Rs during the on phase of the switch S1. This voltage represents the current flowing through the inductor L1 during the on phase and is supplied to the pin PN2. The first actual value signal is naturally "zero" in the time period during which the switch S1 is turned off.

For the off phase, a second actual value signal is determined which is formed by the voltage drop across the resistor R2 of a voltage divider R1/R2 and represents, indirectly or directly, the inductor voltage or the voltage across the LED path in the off phase. For this purpose, the voltage divider R1/R2 is connected between ground and the mid-potential point.

A further voltage divider R3/R4 is connected between ground and the high potential point. The voltage drop across the resistor R4 is supplied to the input pin PN5. It represents the input voltage VIN in the two switching phases. The open-loop control circuit SR can now calculate the voltage across the load circuit by virtue of subtracting the voltage which is measured by means of the voltage divider R1/R2 and, as mentioned, corresponds to the voltage between ground and the mid-potential, from the input or operating voltage VIN.

The input or operating voltage VIN can also be known and does not need to be measured via a voltage divider R3/R4. This may be the case, for example, when the voltage across the input terminals VIN is provided by an active (clocked) power factor circuit (PFC circuit) and is adjusted by closed-loop control to a fixed value.

Thus, the inductor current in the on phase and the load circuit voltage in the off phase are available for the calculation of the duty factor and the clock frequency for the switch S1. It is theoretically readily comprehensible for the desired aim, namely that of calculating the switching signals for the switch S1, to thus be possible.

The preceding text provides a basic description of the way in which the circuit functions with reference to FIG. 1, which represents the prior art.

FIGS. 2 to 10, which represent the individual embodiments of the invention, are illustrated in such a way that elements which are novel and are essential to the invention are emphasized using lines in bold font.

Figure 2:
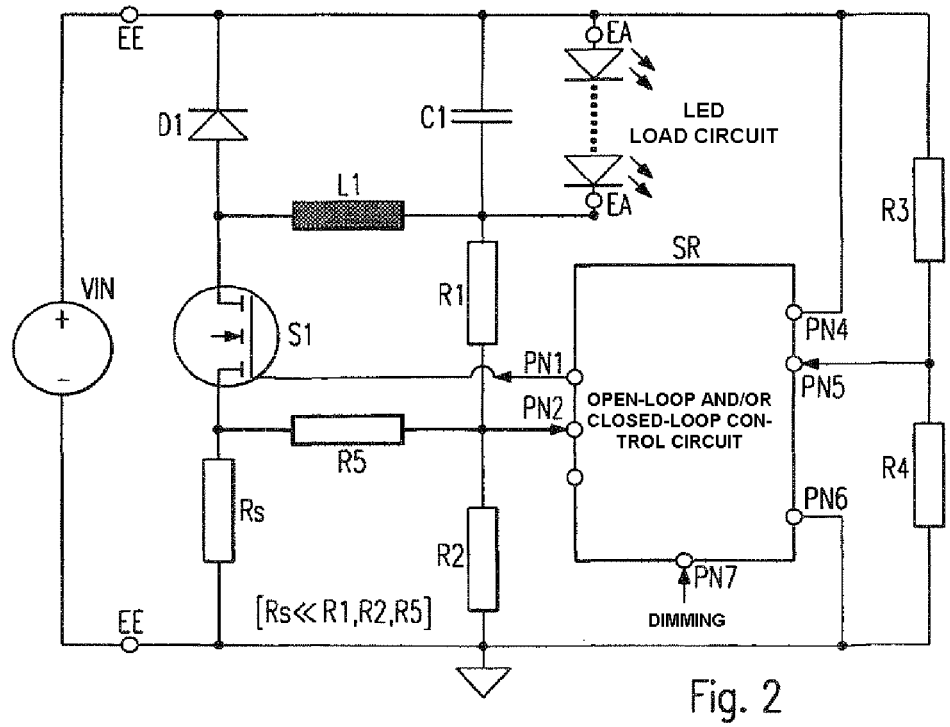

In FIG. 2, the input pin 3 which is still provided in FIG. 1 has been omitted, i.e. dispensed with. The voltage drop across the shunt RS therefore forms the first actual value signal, and the voltage drop across the resistor R2 of the voltage divider R1/R2 forms the second actual value signal. The two actual value signals are evaluated in temporally separate phases (switch-on phase or switch-off phase of the switch of the LED driver) ("time multiplexing"). The two actual value signals are tapped off at a common measurement point in the LED driver circuit and can therefore be supplied to a common input pin PN2 of the open-loop and/or closed-loop control circuit SR. A second actual value signal is determined for the off phase, said second actual value signal being formed by the voltage drop across the resistor R2 of a voltage divider R1/R2 and representing, indirectly or directly, the inductor voltage or the voltage across the LED path in the off phase. For this purpose, the voltage divider R1/R2 is connected between ground and the mid-potential potential.

In order to avoid a situation in which the two actual value signals influence one another in the temporally separate phases and therefore unique evaluation is not possible, a decoupling element such as a decoupling resistor R5 or a diode etc. is inserted between the two actual value signal paths.

In this case, the condition that the resistance value of the shunt Rs is substantially lower than the resistance value of the resistors R1, R2 and R5 holds true.

In the on phase of the switch S1, the voltage drop across the shunt Rs forms a voltage with a substantially lower internal resistance than the voltage source which produces the second actual value signal. To this extent, the voltage across the shunt Rs is dominant and determines the voltage level at the input pin PN2 during the on phase.

When the switch S1 is switched into the off state, there is virtually no current flowing through the switch S1 and the shunt Rs any more, with the result that the potential at the node between the shunt Rs and the switch S1 is undefined, i.e. floating (with potential being drawn to ground owing to the shunt Rs) In this case, the voltage drop across the resistor R2 which is provided by the voltage divider R1/R2 and forms the second actual value signal is dominant. It therefore determines the potential at the input pin PN2.

The open-loop control circuit SR can calculate the voltage across the LED load circuit in the off phase by virtue of subtracting the voltage which is measured by means of the voltage divider R1/R2 and, as mentioned, corresponds to the voltage between ground and the mid-potential from the input or operating voltage VIN.

The open-loop control circuit SR, which is in the form of an ASIC, also has an input pin PIN 7, to which an external dimming signal can be supplied. The external dimming signal can be supplied as a binary signal (OFF or ON), as a reference voltage or as a reference voltage which can be connected (the reference voltage can alternate between an ON value with variable amplitude and OFF), for example.

It is important for it to be possible to dispense with an input pin at an IC in the manner described above. The circuit is thus simplified and can be produced at lower cost. The principle is of course not restricted to the actual value signals under consideration here and the corresponding pins, but applies quite generally.

Figure 3:
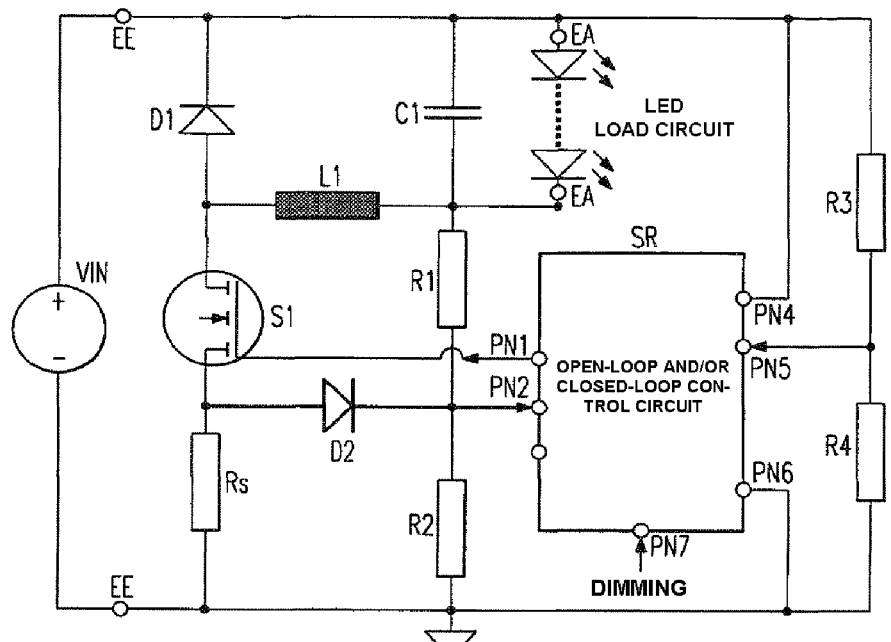

The circuit shown in FIG. 3 has been modified with respect to the circuit shown in FIG. 2 in that the decoupling resistor R5 has in this case been replaced by a decoupling diode D2. This decoupling diode is connected in such a way that its anode is connected to the node between the shunt Rs and the switch S1, while its cathode is connected to the node between the resistors R1 and R2 of the voltage divider R1/R2 and to the input pin PN2. This ensures that the decoupling diode D2 is in the on state in the on phase of the switch S1 and is in the off state in the off phase. This results in an intensification of the decoupling effect which can already be achieved in FIG. 2 by the decoupling resistor R5.

Figure 4:
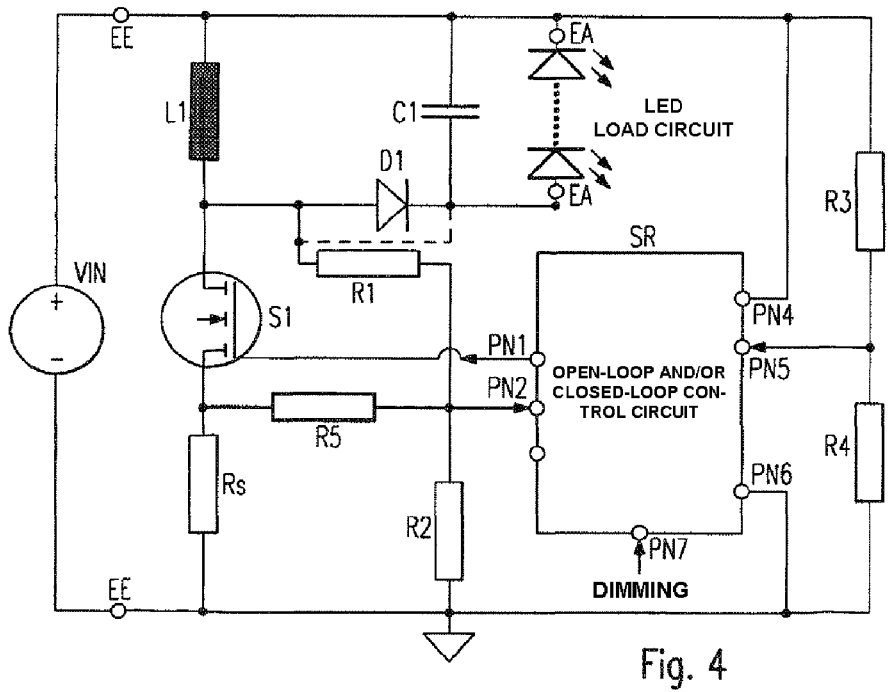

The circuit variant shown in FIG. 4 corresponds to that shown in FIG. 2, with only the positions of the inductor L1 and the freewheeling diode D1 having been swapped over. In addition, the resistor R1 in this case acts at the node between the inductor L1 and the freewheeling diode D1 or between the LED load circuit and the freewheeling diode D1 (illustrated by dashed lines).

This embodiment is intended to demonstrate that the buck converter principle used in FIGS. 1 to 3 is not essential for the present circuit but that, instead, as shown in FIG. 4, the buck-boost converter principle or else the boost converter principle, the flyback converter principle or the forward converter principle can be used (not illustrated).

When the tap of the resistor R1 for monitoring a voltage during the off phase is connected to the node between the inductor L1 and the switch S1, the measurement can also be used to determine the zero crossing of the inductor current during the off phase. When the inductor L1 is demagnetized, this results in a change in the voltage at the tap of the resistor R9 (the node between the inductor L1 and the switch S1). The voltage at the tap of the resistor R9 is approximately equal to the operating voltage VIN during the off phase as long as the inductor L1 is magnetized and drives the current through the LED load circuit.

When the inductor L1 is no longer magnetized and the inductor current reaches the zero crossing, the freewheeling diode D1 begins its off state and the voltage at the tap of the resistor R9 drops to a lower value.

The knowledge of the zero crossing is advantageous because it is preferred to set the time at which the switch S1 is switched on again to this zero crossing. It is thus possible to avoid switching losses, and the switch is subjected to less thermal load (only very low switch-on losses occur at the switch S1 owing to the demagnetized inductor L1 and the zero crossing associated therewith). This type of driving of the switch S1 is also referred to as the critical mode or borderline mode between the continuous conduction mode and the discontinuous conduction mode.

The charging capacitor C1 in parallel with the LED load circuit can continue to drive the current through the LED during the phase of the zero crossing. As soon as the inductor L1 has been demagnetized, it can no longer continue to drive the current through the LED load circuit. In the phase up until the time at which a current is flowing through the inductor L1 again as a result of the switch S1 being switched on again, the charging capacitor C1 in parallel with the LED load circuit can, owing to its charge (which is charged during the switch-on time of the switch S1), continue to drive the current through the LED.

Figure 5:
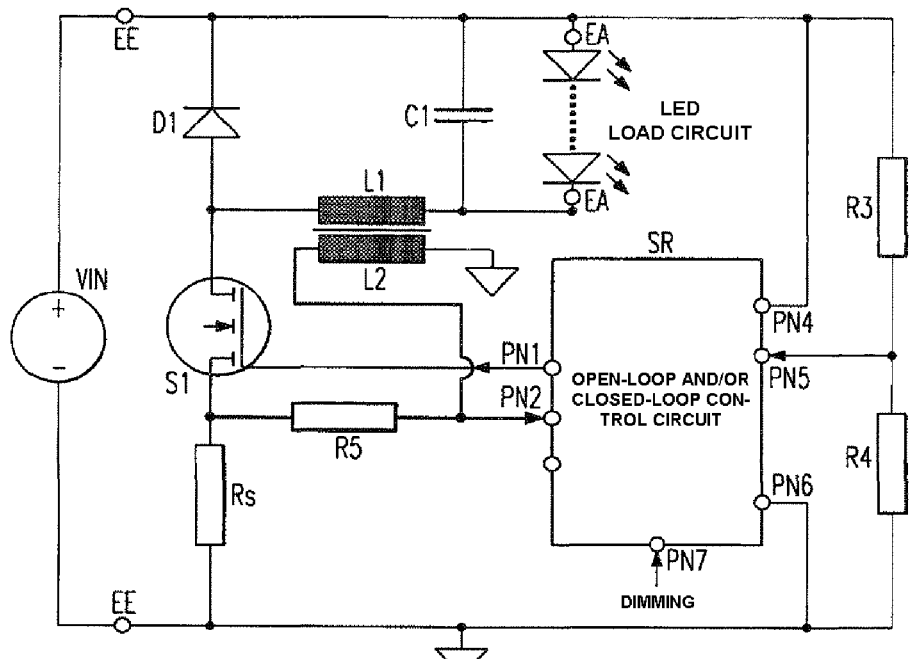

In FIG. 5, the voltage divider R1/R2 has been omitted. Instead, the inductor L1 is coupled magnetically to a further winding L2, with which the inductor voltage can be coupled out by means of a transformer.

This means that the voltage drop across the shunt Rs, which represents the inductor current, is still used as actual value signal in the on phase of the switch S1. In the off phase, the second actual value signal is then used, said signal being coupled out of the inductor L1 by means of a transformer and representing the inductor voltage. Given knowledge of the inductor size (inductance of the inductor L1), it is naturally also possible to calculate the inductor current via the inductor voltage. Correspondingly, although it is still included in the illustration it is possible to dispense with the pin PN5 to which a further actual value signal is supplied, said actual value signal representing the operating voltage VIN. It is therefore likewise possible to dispense with the resistors R3/R4 forming the further voltage divider.

This circuit can also be used to determine the zero crossing of the inductor current during the off phase. The knowledge of the zero crossing is advantageous because it is preferred to set the time at which the switch S1 is switched on again to this zero crossing. It is thus possible to avoid switching losses, and the switch is subjected to less thermal load. This type of driving of the switch S1 is also referred to as the critical mode or borderline mode between the continuous conduction mode and the discontinuous conduction mode, as has already been mentioned.

The charging capacitor C1 in parallel with the LED load circuit can continue to drive the current through the LED during the phase of the zero crossing. As soon as the inductor L1 has been demagnetized, it can no longer continue to drive the current through the LED.

In the phase up until the time at which a current is flowing through the inductor L1 again as a result of the switch S1 being switched on again, the charging capacitor C1 in parallel with the LED load circuit can, owing to its charge (which is charged during the switch-on time of the switch S1), continue to drive the current through the LED.

Figure 6:
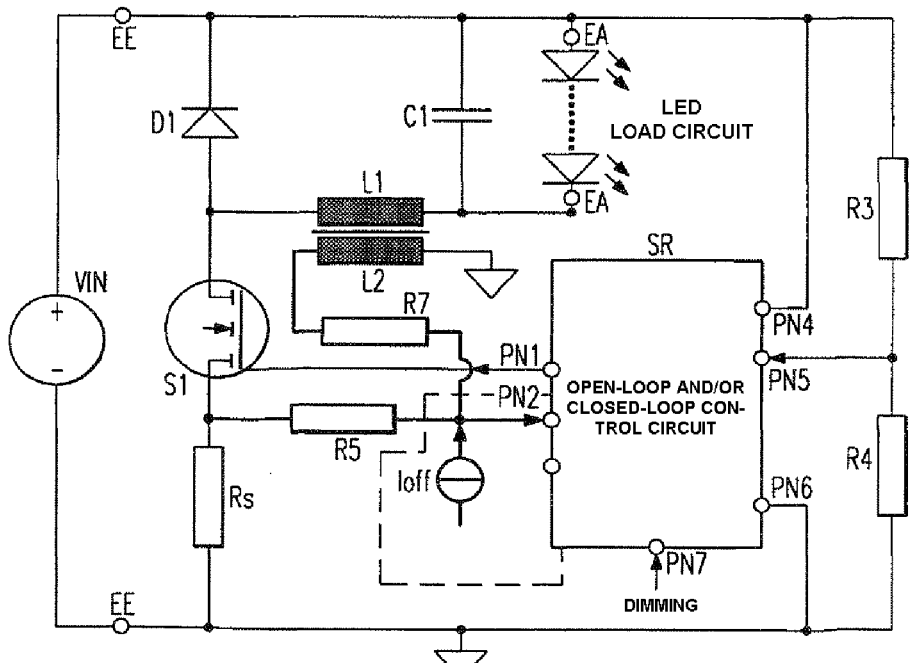

The embodiment shown in FIG. 6 is likewise characterized in that the second actual value signal is coupled out of the inductor L1 with a second winding L2 by means of a transformer.

The inductor voltage can be coupled out by means of a transformer via the winding L2, which is coupled magnetically to the inductor L1. This means that the voltage drop across the shunt Rs, which represents the inductor current, is still used as actual value signal in the on phase of the switch S1.

In the off phase, the second actual value signal is then used, said signal being coupled out of the inductor L1 by means of a transformer and representing the inductor voltage. Given knowledge of the inductor size (inductance of the inductor L1), it is naturally also possible to calculate the inductor current via the inductor voltage and therefore arrive at the current through the LED load circuit. Correspondingly, although it is still included in the illustration it is possible to dispense with the pin PN5 to which a further actual value signal is supplied, said actual value signal representing the operating voltage VIN. It is therefore likewise possible to dispense with the resistors R3/R4 forming the further voltage divider.

Secondly, it is unfavorable for the operation of the ASIC if a negative voltage is supplied to the input pin PN2. For this reason, an offset current Ioff is in addition also supplied to the input pin PN2 in order to raise the potential at the input pin PN2. Preferably, the offset current Ioff is produced internally within the open-loop control circuit SR and also supplied internally to the input pin PN2. This measure requires further decoupling by means of a decoupling resistor R7.

The monitoring of the inductor voltage can advantageously be used in a so-called continuous conduction mode of the circuit (in particular of the switch S1), but also in a so-called discontinuous conduction mode or a so-called critical mode or borderline mode between the continuous conduction mode and the discontinuous conduction mode. During operation in the continuous conduction mode, the charging capacitor C1 in parallel with the LED load circuit can have a very low capacitance or can even be omitted entirely.

This circuit shown in FIG. 6 can also be used to determine the zero crossing of the inductor current during the off phase. The knowledge of the zero crossing is advantageous because it is preferred to set the time at which the switch S1 is switched on again to this zero crossing. It is thus possible to avoid switching losses, and the switch is subjected to less thermal load. It is thus possible for the voltage drop across the shunt Rs to be determined as actual value signal in the on phase of the switch S1 and for the inductor voltage and/or the zero crossing of the inductor current to be determined in the off phase.

Figure 7:
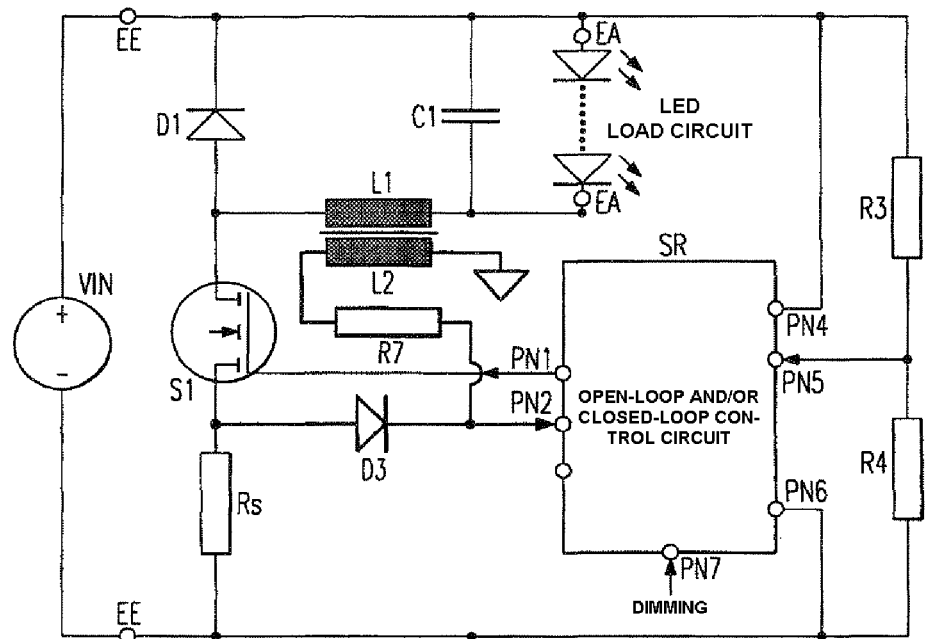

The embodiment of the circuit shown in FIG. 7 corresponds to that shown in FIG. 5, with only a decoupling diode D3 being provided in place of the decoupling resistor R5, said decoupling diode acting in the same way as has already been described in connection with FIG. 3. Preferably, it is possible for the zero crossing of the inductor current to be determined via the coupling-out winding L2.

Figure 8:
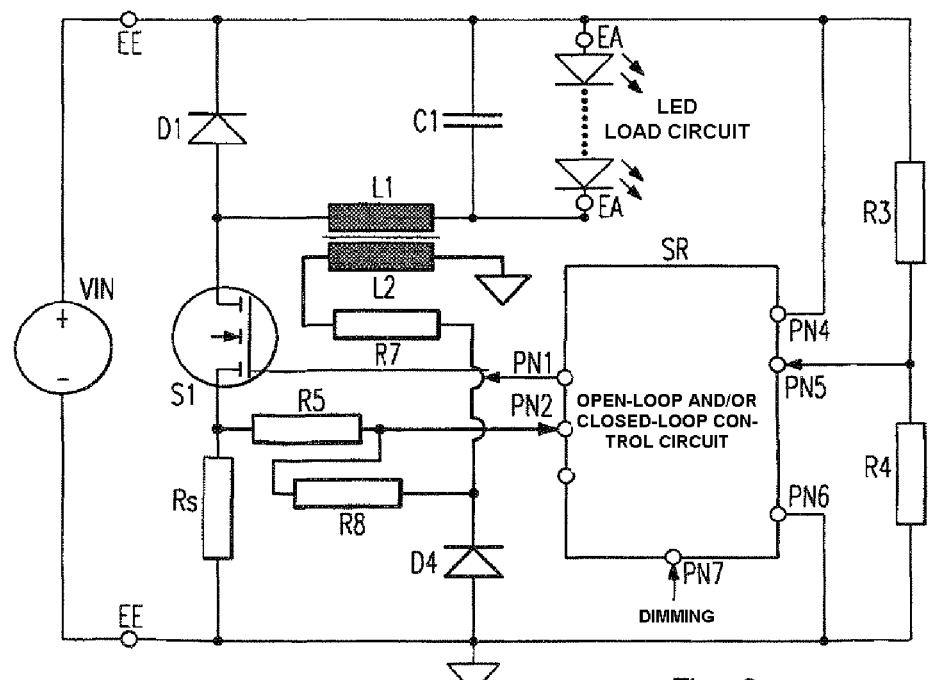

The embodiment shown in FIG. 8 is comparable to that shown in FIG. 6. It is likewise used to determine the zero crossing of the inductor current. The offset current is in this case produced by a network comprising a diode D4 and the resistors R7, R5 and R8. The anode of the diode D4 is connected to ground. The cathode of this diode D4 is connected to the coupling-out winding via the resistor R7. The above-mentioned current path is connected to the input pin PN2 via a decoupling resistor R8.

Figure 9:
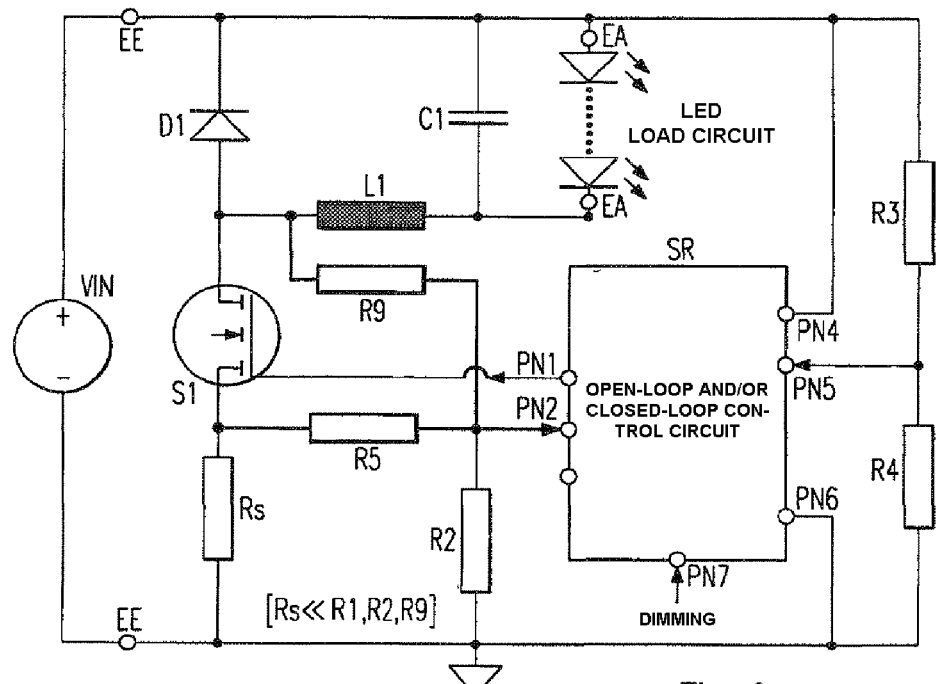

The embodiment shown in FIG. 9 shows an alternative possibility for monitoring the inductor voltage or the magnetization of the inductor L1 and for producing the second actual value signal. In this case, the node between the freewheeling diode D1 and the switch S1 is connected to the input pin PN2 via a further decoupling resistor R9. As has already been described for the circuits shown in FIGS. 2 to 4, the additional condition that the shunt Rs needs to have a much lower resistance than the decoupling resistors R1, R2 and R9 applies in this case too.

The monitoring of the inductor voltage or the tap of the resistor R9 (the node between the inductor L1 and the switch S1) can also be used, as has already been mentioned, to determine the zero crossing of the inductor current during the off phase.

When the inductor L1 has been demagnetized, this results in a change in the voltage at the tap of the resistor R9 (the node between the inductor L1 and the switch S1). The voltage at the tap of the resistor R9 is approximately equal to the operating voltage VIN during the off phase as long as the inductor L1 is magnetized and drives the current through the LED load circuit. When the inductor L1 is not longer magnetized and the inductor current reaches the zero crossing, the freewheeling diode D1 begins its off state and the voltage at the tap of the resistor R9 drops to a lower value.

The knowledge of the zero crossing is advantageous because it is preferred to set the time at which the switch S1 is switched on again to this zero crossing. It is thus possible to avoid switching losses, and the switch is subjected to less thermal load. This type of driving of the switch S1 is also referred to as the critical mode or borderline mode between the continuous conduction mode and the discontinuous conduction mode.

The charging capacitor C1 in parallel with the LED load circuit can continue to drive the current through the LED during the phase of the zero crossing. As soon as the inductor L1 has been demagnetized, it can no longer continue to drive the current through the LED.

In the phase up until the time at which a current is flowing through the inductor L1 again as a result of the switch S1 being switched on again, the charging capacitor C1 in parallel with the LED load circuit can, owing to its charge (which is charged during the switch-on time of the switch S1), continue to drive the current through the LED.

Figure 10:
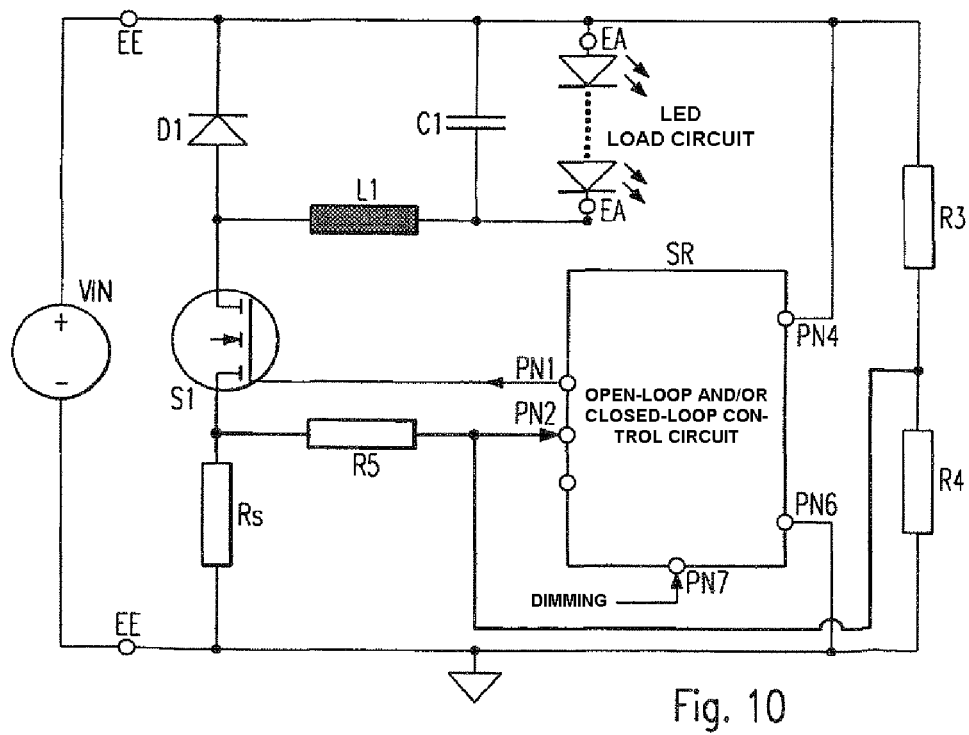

FIG. 10 shows an embodiment in which the second actual value signal represents the operating voltage VIN and is obtained as a voltage drop across the resistor R4 of the voltage divider R3/R4. This variant is particularly expedient when the input or operating voltage is not constant, for example because it is obtained by rectification of the system voltage and/or because there is no power factor circuit (PFC circuit) connected upstream. In such a case, the operating voltage or input voltage can have considerable ripple.

Figure 11:
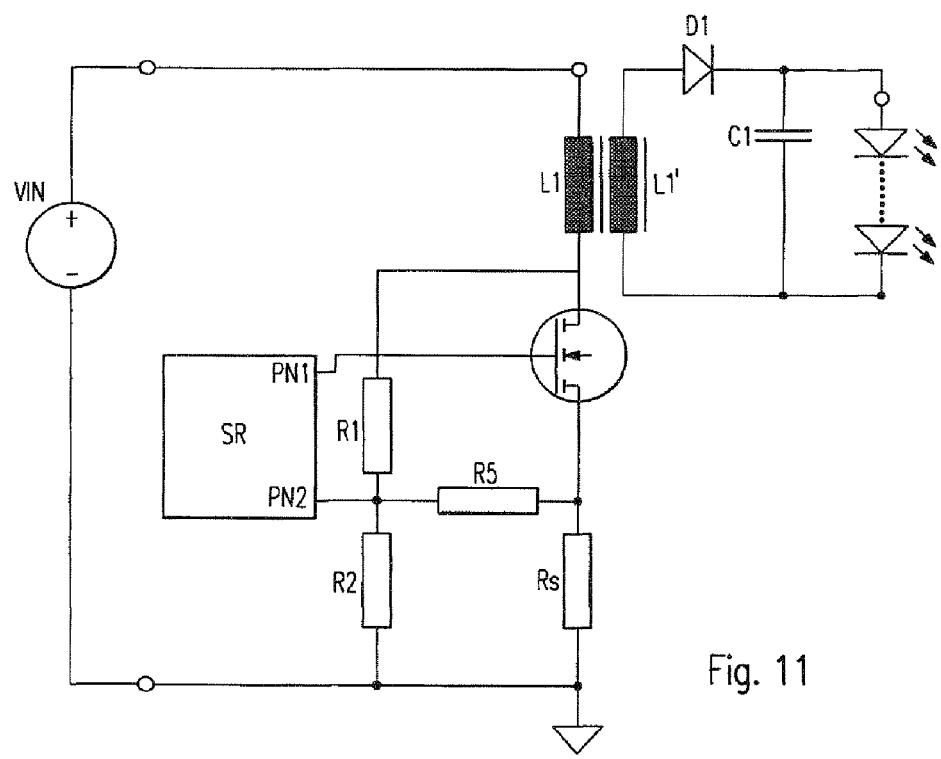

The circuit variant shown in FIG. 11 differs from the preceding embodiments in that the inductor L1 is coupled magnetically to a secondary winding L1'. This embodiment is intended to demonstrate that the buck converter principle used in FIGS. 1 to 3 and 5 to 10 is not essential for the present circuit and that, instead, another switching regulator principle can also be used, as in FIG. 4. The circuit variant illustrated in FIG. 11 represents an example of a flyback converter.

When using a flyback converter principle, the inductor L1 can be replaced by an inductor L1 with a magnetically coupled secondary winding L1', which together therefore form a transformer. The secondary winding L1' can in this case feed the LED load circuit via a freewheeling diode D1 and a charging capacitor C1 (in parallel with the LED load circuit). In addition, the inductor L1 can be coupled magnetically to a further coupling-out winding L2 (not illustrated).

In this case, the voltage drop across the shunt Rs can furthermore be monitored as actual value signal in the on phase of the switch S1, for example. In the off phase, the inductor voltage and/or the zero crossing of the inductor current can be determined in a similar way to that in the exemplary embodiments relating to FIGS. 2 to 9, for example. By way of example, the resistance R1 can be tapped off at the node between the inductor L1 and the switch S1. However, it is also possible for a signal to be tapped off on the secondary side of the LED driver circuit, preferably by means of electrical isolation, and to be supplied to the open-loop and/or closed-loop control circuit SR as actual value signal.

This embodiment is also intended to demonstrate that the buck converter principle used in FIGS. 1 to 3 and 5 to 10 is not essential for the present circuit but that, instead, as shown in FIG. 4, the buck-boost converter principle or else the boost converter principle, the flyback converter principle (as in FIG. 11) or the forward converter principle can be used.

The invention claimed is:

1. A driver circuit for at least one LED, the driver circuit comprising:
   input terminals to be connected to an input or operating voltage in the form of a direct current (DC) voltage or a rectified alternating (AC) voltage,
   output terminals to be connected to a load circuit, said load circuit containing the at least one LED,
   an inductor,
   a clocked switch,
   an open-loop control circuit for clocking the switch, said open-loop control circuit comprising an integrated circuit (IC) having input and output pins,
   wherein the open-loop control circuit generates a clock signal for the switch based on at least two actual value signals,
   wherein the two actual value signals are associated with different switching phases of the switch,
   wherein the inductor is connected in such a way that it is charged in one switching phase of the switch and is discharged in another switching phase,
   and wherein a current is driven through the load circuit, at least in the other switching phase,
   such that the two actual value signals are tapped off in different time periods or at different times, but at a common measurement point in the driver circuit.

2. The circuit as claimed in claim 1, wherein one actual value signal represents the inductor current during an on phase of the switch.

3. The circuit as claimed in claim 2, wherein:
   the input voltage is defined by a potential difference between a reference potential point (ground) and a high potential point,
   the load circuit is connected between the high potential and a mid-potential point of the circuit,
   the other actual value signal corresponds to a voltage between the mid-potential and the reference potential (ground) and therefore, given a substantially constant input voltage, represents a load circuit voltage during an off phase of the switch.

4. The circuit as claimed in claim 1, wherein the other actual value signal represents the inductor voltage during an off phase of the switch.

5. The circuit as claimed in claim 1, wherein the other actual value signal represents zero crossing of the inductor current during an off phase of the switch.

6. The circuit as claimed in claim 5, wherein the other actual value signal is coupled out of the inductor by a transformer via a magnetically coupled winding.

7. The circuit as claimed in claim 1, wherein the input voltage is not constant, the signal selected for the other actual value signal corresponds to the input voltage and therefore represents said input voltage during an off phase of the switch.

8. The circuit as claimed in claim 1, wherein the actual value signal paths connected to the common input pin are decoupled by a decoupling network such that the actual value signals are identifiable as being separate and evaluated.

9. The circuit as claimed in claim 8, wherein the decoupling network is formed by one or more resistors.

10. The circuit as claimed in claim 8, wherein the decoupling network is formed by at least one diode, and in that the diode is polarized in such a way that it is in the off state in one switching phase of the switch and is turned on in the other switching phase.

11. The circuit as claimed in claim 2, wherein the first actual value signal is a voltage drop across a shunt, which is connected in series with the switch in the on phase of the switch.

12. The circuit as claimed in claim 1, wherein:
   the input voltage is defined by a potential difference between a reference potential point (ground) and a high potential point,
   the load circuit is connected between the high potential and a mid-potential point of the circuit,
   the switch is connected in series with a freewheeling diode, wherein one terminal of said freewheeling diode is connected to the high potential point of the input voltage,
   the inductor is connected between the node connecting the switch and the freewheeling diode and the mid-potential point of the circuit, and
   the freewheeling diode is polarized in such a way that it is in an off state in an on phase of the switch and is in an on state in an off phase of the switch.

13. The circuit as claimed in claim 1, wherein the load circuit is bridged by a charging capacitor.

14. The circuit as claimed in claim 13, wherein the actual value signal path of the other actual value signal is formed by a voltage divider.

15. The circuit as claimed in claim 1, wherein a further actual value signal represents the input voltage and is supplied to a separate input pin of the open-loop control circuit.

16. The circuit as claimed in claim 1, wherein the switch is formed by a metal-oxide semiconductor field-effect transistor (MOSFET).

17. The circuit as claimed in claim 1, wherein the open-loop control circuit has further input pins to be coupled to a dimming signal and a supply voltage.

18. The circuit as claimed in claim 1, wherein the open-loop control circuit has an output pin, which is connected to the control input for the switch.

19. A driver circuit for at least one LED, the driver circuit comprising:
   input terminals to be connected to an input or operating voltage in the form of a direct current (DC) voltage or a rectified alternating (AC) voltage,
   output terminals to be connected to a load circuit, said load circuit containing the at least one LED,
   an inductor,
   a clocked switch,
   an open-loop control circuit for clocking the switch, said open-loop control circuit comprising an integrated circuit (IC) having input and output pins,
   wherein:
   the open-loop control circuit generates a clock signal for the switch based on at least two actual value signals,
   the two actual value signals are associated with different switching phases of the switch,
   the inductor is connected in such a way that it is charged in one switching phase of the switch and is discharged in another switching phase,
   a current is driven through the load circuit, at least in the other switching phase, the input voltage is defined by a potential difference between a reference potential point (ground) and a high potential point, the load circuit is connected between the high potential and a mid-potential point of the circuit, and the other actual value signal corresponds to a voltage between the mid-potential and the reference potential (ground) and therefore, given a substantially constant input voltage, represents a load circuit voltage during an off phase of the switch, such that the two actual value signals are tapped off in different time periods or at different times, but at a common measurement point in the driver circuit.

20. A driver circuit for at least one LED, the driver circuit comprising:

input terminals to be connected to an input or operating voltage in the form of a direct current (DC) voltage or a rectified alternating (AC) voltage, output terminals to be connected to a load circuit, said load circuit containing the at least one LED, an inductor, a clocked switch, an open-loop control circuit for clocking the switch, said open-loop control circuit comprising an integrated circuit (IC) having input and output pins, wherein the open-loop control circuit generates a clock signal for the switch based on at least two actual value signals, a first actual value signal of the at least two actual value signals being a voltage drop across a shunt, which is connected in series with the switch in the on phase of the switch, wherein the two actual value signals are associated with different switching phases of the switch, wherein the inductor is connected in such a way that it is charged in one switching phase of the switch and is discharged in another switching phase, and wherein a current is driven through the load circuit, at least in the other switching phase, such that the two actual value signals are tapped off in different time periods or at different times, but at a common measurement point in the driver circuit.

* * * * *